(12) United States Patent
Mauchan

(10) Patent No.: US 6,227,729 B1
(45) Date of Patent: May 8, 2001

(54) FILM CASSETTE

(75) Inventor: Donald E. Mauchan, Marlboro, MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/384,297

(22) Filed: Aug. 26, 1999

(51) Int. Cl.⁷ .................................................. G03B 17/26
(52) U.S. Cl. ................................. 396/517; 396/527
(58) Field of Search ................................. 396/512, 517, 396/527, 583; 206/455; 378/188

(56) References Cited

U.S. PATENT DOCUMENTS

| 3,682,076 | 8/1972 | Erlichman | 396/30 |
| 3,733,679 | * 5/1973 | Bruneau | 29/431 |
| 4,096,501 | 6/1978 | Beals et al. | 396/583 |
| 4,256,396 | * 3/1981 | Johnson et al. | 396/517 |
| 4,685,791 | 8/1987 | Falzone et al. | 396/33 |

FOREIGN PATENT DOCUMENTS 60-203932 * 10/1985 (JP) ..................................... 378/188

* cited by examiner

Primary Examiner—D. Rutledge
(74) Attorney, Agent, or Firm—Tim A. Cheatham; Gaetano D. Maccarone

(57) ABSTRACT

There is described a film cassette for housing and dispensing film units of the self-developing type. The cassette includes structure which ensures that it can be inserted only in photographic apparatus particularly adapted to receive it.

4 Claims, 1 Drawing Sheet

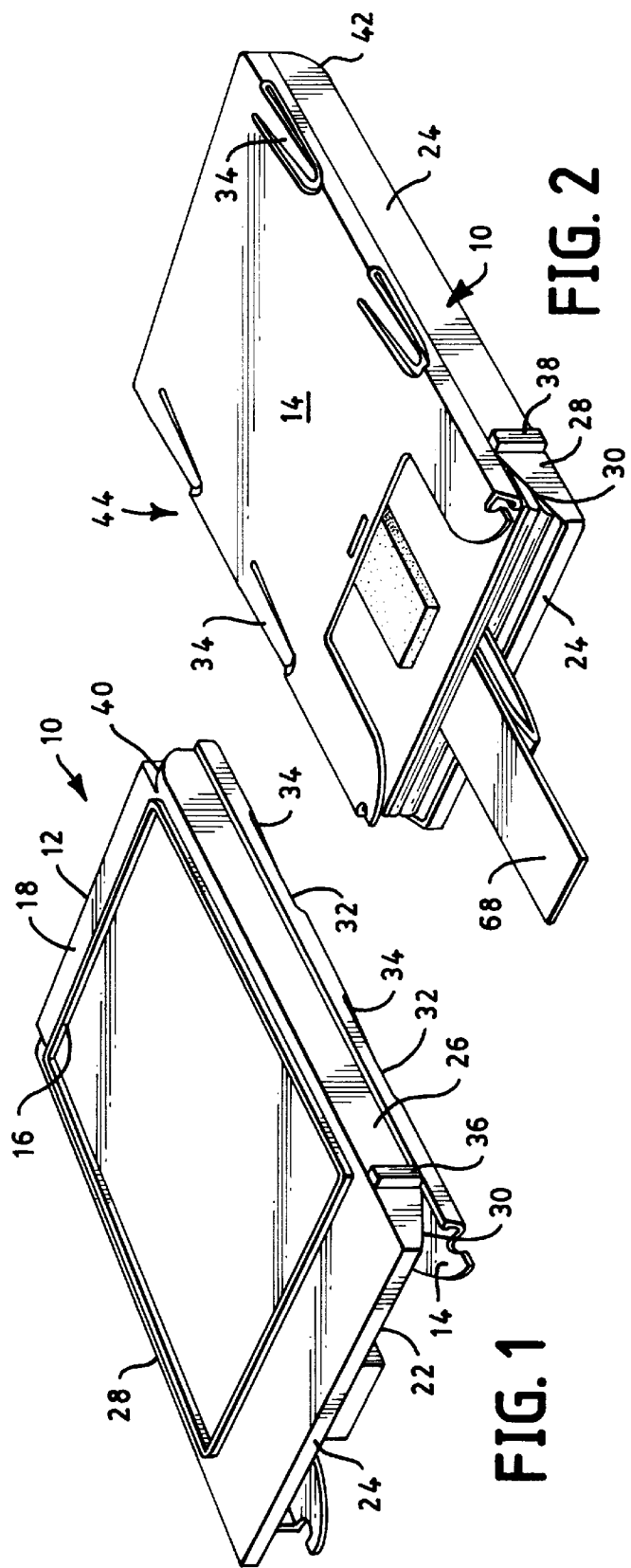
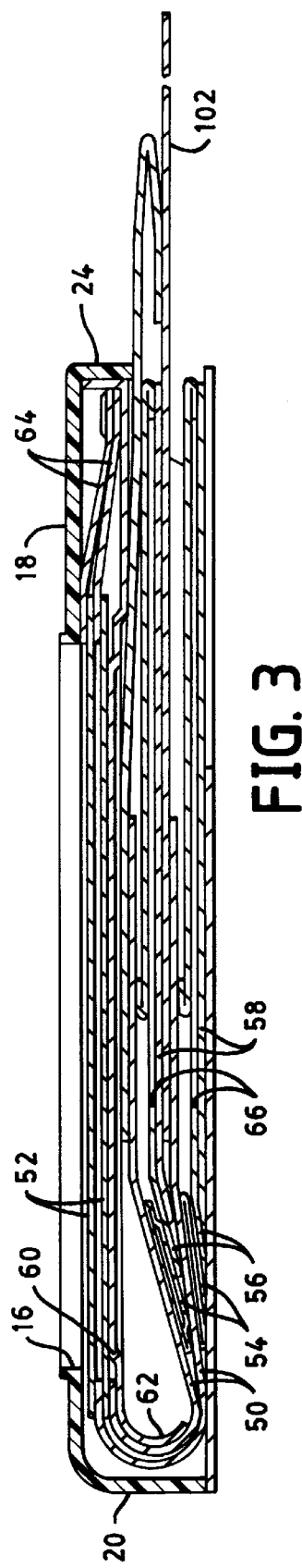

FILM CASSETTE

BACKGROUND OF THE INVENTION

This invention relates generally to a photographic film cassette, or cartridge, for use in a camera of the self-developing type in which photographic film exposed within the camera is developed by a process involving diffusion transfer upon being withdrawn from the camera. More particularly, the invention relates to a photographic film cassette wherein a plurality of photographic film units are arranged in a flat configuration so as to be exposed within a photographic apparatus.

Cassettes which are capable of retaining instant, self-developing film units are well known in the art. Such cassettes are typically flat, elongated containers having an exposure opening in one wall through which light from the subject or scene being photographed can be focused and an exit opening formed in another wall through which an exposed film unit can be withdrawn from the container for photographic processing subsequent to having been exposed within the photographic apparatus.

Diffusion transfer photographic self-developing film units include a photosensitive, or negative, element and an image-receiving, or positive, element in the form of thin, sheet-like members. In one embodiment, commonly referred to as "peel-apart" the photosensitive and image-receiving elements are designed to be separated from each other after exposure and photographic processing have been effected. In another embodiment, commonly referred to as "integral", the photosensitive and image-receiving elements are retained together after photoexposure and photographic processing have been carried out. Both types of instant, self-developing film units have been described extensively in the literature and are well known to those skilled in the art.

Generally speaking, a plurality of self-developing film units are arranged in stacked relationship within the cassette and typically the photosensitive element of each successive film unit is urged into position at the focal plane of the photographic apparatus by some pressure-applying means which may be within the cassette or partially outside the cassette. In the case of a peel-apart film unit the respective photosensitive and image-receiving elements can be arranged in superposed relationship such that the photosensitive layer(s) and the image-receiving layer of each film unit face in the direction of the exposure opening in the cassette. The cassette, as noted previously, may also include pressure-applying means, which may include a plate located between the respective elements to urge the photosensitive element into a phase which coincides with the focal plane of the photographic apparatus. Typically, in the peel-apart type, the photosensitive and image-receiving elements are interconnected by web means which cooperate with the pressure-applying means so the image-receiving element can be moved relative to the cassette, after exposure of the photosensitive element, until it is positioned in registration with, and adjacent to, the exposed photosensitive element with the photosensitive layer(s) of the photosensitive element adjacent to the image-receiving layer of the image-receiving element. In this registered relationship the introduction of a photographic processing composition between the photosensitive and image-receiving elements initiates photographic development and results in image-forming materials being transferred by diffusion from the photosensitive element to the image-receiving element. The introduction of the processing composition can take place when the respective elements, in registered superposed relationship, are moved longitudinally through the exit opening of the cassette and through pressure-applying means, typically a pair of rollers, mounted within the photographic apparatus. Preferably, the processing composition is contained within a rupturable fluid-holding container, commonly referred to as a "pod" which is attached to the film unit. Movement of the film unit through the pressure-applying means causes the pod to rupture and the fluid processing composition to be distributed between the elements. Upon passage of the film unit through the pressure-applying means and the resultant spreading of the processing composition, the diffusion of image-forming materials to the positive element preferably takes place outside the photographic apparatus.

Various types of self-developing film units are available commercially and each is intended to be used in conjunction with particular photographic apparatus. The characteristics of the appropriate photographic apparatus, in conjunction with the film units provide the results desired. Thus, it is important that a photographic film cassette containing self-developing film units designed to be used with particular photographic apparatus not be inserted into, and exposed and processed with, different photographic apparatus. It is therefore an object of the invention to provide a photographic film cassette which can only be inserted in photographic apparatus specifically designed to accept the cassette.

SUMMARY OF THE INVENTION

The present invention is directed to a photographic film cassette for holding self-developing film units which is capable of being inserted only into photographic apparatus specifically designed to receive such cassette.

In accordance with the invention the film cassette for use with photographic apparatus of the instant, self-developing type includes an area for holding a plurality of self-developing photographic film units. An exposure aperture is provided in a wall of the cassette and in operative relationship with each of the successive topmost film units of the stack. In this manner the photosensitive layer(s) of the photosensitive element of each successive topmost film unit can be exposed to light from a subject or scene. An end wall defining an exit slot is provided in the cassette. The exit slot is in adjoining cooperative relationship with each successive topmost film unit to allow ejection of such exposed film units from the cassette. For yieldably supporting the stack of film units there is provided means for urging the photosensitive layer(s) of each successive topmost film unit into registry with the exposure aperture and at the focal plane of the photographic apparatus. Such means typically include a spring. There is also provided a film stop means on the end wall of the cassette for defining a clearance, or effective, opening in the exit slot which permits only a single film unit to be ejected therethrough at any one time. There is further provided means for attaching the end wall to the cassette and for controlling positioning of the film stop means so as to establish the requisite clearance.

At least one of the side walls of the cassette includes a detent which may be positioned at any location along the sidewall. Further, there is provided in the cassette at least one shoulder portion formed in a sidewall in the vicinity of the location where the sidewall and the trailing end wall, i.e., the end wall opposite the end wall defining the exit slot, come in contact with each other.

The shoulder portion(s) and the sidewall detent(s) ensure that the film cassette of the invention can only be inserted into photographic apparatus specifically designed to accept the cassette. Further, other film cassettes which do not include the features of the present cassette will not be able to be inserted into photographic apparatus designed to accept the photographic film cassette of the invention.

Among the objects and features of the present invention is the provision for an improved photographic film cassette of the type housing instant, self-developing film units; the provision of a film cassette with an end wall thereof having an arrangement for establishing and controlling the clearance of a slot from which the film units are ejected; and the provision of an improved film cassette of the foregoing type which has structure such that the cassette can only be inserted in photographic apparatus particularly designed to accept such cassettes and other cassettes will not be accepted by such apparatus.

Other objects and further scope of applicability of the present invention will become apparent from the detailed description of the preferred embodiments to follow when taken in conjunction with the accompanying drawings in which like parts are designated by like reference numerals.

BRIEF DESCRIPTION OF THE DRAWINGS

FIG. 1 is a partially schematic perspective view of an embodiment of a film cassette according to the convention;

FIG. 2 is a partially schematic, bottom view of a cassette according to the invention with retained film units shown therein;

FIG. 3 is a partially schematic, side sectional view taken through the cassette of FIG. 2 which illustrates in general the sequence of photosensitive elements and image-receiving elements as arranged within the film cassette.

DESCRIPTION OF THE PREFERRED EMBODIMENTS

The cassette of the invention will be described in detail with respect to a preferred embodiment wherein the film units housed in the cassette are of the peel-apart type, that is, after exposure and photographic processing, the image-receiving element and the photosensitive element are separated from each other. However, the cassette of the invention can also be utilized to house integral self-developing film units.

Referring now to FIG. 1 there is seen a film cassette 10 which comprises a main housing element 12 and a slidable closure element 14 which, in combination with the main housing element forms a structure having the capability of retaining therein a plurality of film units and a pressure-applying member in stacked relationship. Main housing element 12 is a generally elongated body having an exposure aperture 16 in top wall 18 through which light from a subject or a scene being photographed can be focused and a trailing end wall 20. Exit opening 22 through which a film unit can be ejected from the cassette comprises leading end wall 24 which is arranged between sidewalls 26 and 28. Sidewalls 26 and 28, at essentially the point where they abut trailing end wall 20, each comprises a cutout portion which forms for sidewall 26, an edge 30 which has an angular relationship with trailing end wall 20 although such relationship is not critical and the cutout portion may be differently shaped. Housing closure element 14 is provided with notches 32 into which spring tabs 34 are punched. The tabs 34 have a substantial width and can project into the interior of cassette 10 and into engagement with a pressure plate (described in relation to FIG. 3) located between sidewalls 26 and 28. Spring tabs 34 urge a portion of the pressure-applying member which engages a photosensitive element toward exposure aperture 16. It should be noted here that other types of pressure-applying means may be utilized including, for example, spring means located within the cassette or within the photographic apparatus in which case the spring means can extend into the interior of the cassette through openings arranged in closure element 14. Various pressure-applying means are well know in the art. For a film cassette having spring means located in the cassette see, for example U.S. Pat. No. 4,685,791.

In accordance with the invention there is provided in at least one of sidewalls 26 and 28 a detent 36. Preferably each sidewall is provided with a detent as illustrated in FIGS. 1 and 2 where detent 36 is arranged on sidewall 26 and detent 38 is arranged on sidewall 28. The dimensions of detents 36 and 38 are not critical and, further, where each sidewall is provided with a detent, the detents may be of the same dimensions or each may have a different dimension. Also, although the detents 36 and 38 are illustrated in proximity to leading end wall 24, generally the detent may be located anywhere along the length of the sidewall. Preferably, the detents are provided in a rectangular shape. For a cassette as illustrated which houses film units having a 3¼×4¼ inch picture the cassette is about 5¼ inches in length, 3¾ inches in width and about 0.70 inch in height. A typical detent as illustrated is about 0.14 inch in width by 0.40 inch in height and 0.06 inch in depth.

Further, according to the invention at least one sidewall of the cassette comprises a shoulder portion which is located in the vicinity where the sidewall and the trailing end wall come into contact with each other. Preferably the cassette includes two such shoulder portions. The shoulder portions may be of any shape, e.g., linear or curvilinear. In the embodiment illustrated in FIGS. 1–3 it is preferred to provide the shoulder in a radially curved shape, that is, the curvilinear portion forms part of a circle whose center is located on the sidewall. It is also preferred, as illustrated, to provide the cassette with two radially curved shoulder portions 40 and 42. In the preferred illustrated film cassette of the invention, the radially curved shoulder portions have a radius of about 0.38 inch. The dimension of the shoulder portion in the horizontal plane is not critical. In the embodiment shown, this dimension is about 0.13 inch. Generally speaking, the horizontal width of the shoulder portion in this embodiment is controlled primarily by the dimension of the photosensitive element which is not exposed to light, i.e., the border which is adjacent the sidewall. It is preferred that the width of the shoulder portion not extend into the area of the photosensitive element which is exposed so as to avoid any disadvantageous effects on the exposed element when it is brought into contact with the image-receiving element as will be described below.

Referring now to FIGS. 2 and 3, a film pack, or a sandwich of film units of the peel-apart type, is shown in the cassette comprising main housing element 12 and closure element 14. The cassette, designated 44 in FIG. 2 encloses a plurality of film units of the peel-apart type. Each film unit is arranged with photosensitive and image-receiving elements in overlying relationship with the photosensitive layer(s) of the photosensitive element facing toward exposure aperture 16 and with the outermost surface of the image-receiving element which is superposed therewith during processing facing in the same direction. Leader sheet 50 is attached to the photosensitive element 52 at a point intermediate the photosensitive element and associated container of processing composition 54. Carrier sheet 56 is similarly folded adjacent the leading edge of image-receiving element 58 so that portions of the leader sheet 50 and the carrier sheet 56 which connect the photosensitive element 52 and the image-receiving element 58 lie therebetween and the leading and trailing ends of the photosensitive element are disposed adjacent, respectively, the trailing and leading ends of the image-receiving element. The cassette is further provided with a generally flat rectangular pressure plate 60 which is located intermediate the photosensitive element 52 and the other elements of the film unit for supporting the photosensitive layer(s) of photosensitive element 52 against the inner surface of top wall 18 which includes exposure aperture 16. Pressure plate 60 includes a rolled portion 62 around which the leader sheet 50 extends. The rolled section 62 is provided for guiding the photosensitive element 52 around the end of pressure plate 60 after exposure in order to mate it with its associated image-receiving element 58 and place the film unit into position for withdrawal from the cassette. The major portion of the leader sheet 50 includes the rupturable container 54 and is located behind pressure plate 60 between plate 60 and image-receiving element 56. The pressure plate 60 is preferably provided with lateral flanges disposed adjacent the sidewalls of the cassette to provide guidance for the film units.

The exposure aperture 16 of the cassette is immediately adjacent a photosensitive element 52. A trailer sheet 64 is shown attached to one of the photosensitive element and, with one end of carrier sheet 56, provides a trapping arrangement for any excess processing composition. The image-receiving element 58 is attached to a portion of carrier sheet 56 at a point denoted as 66 and provides a mask for defining the image area and for cooperating and spreading of processing composition between the photosensitive and image-receiving elements when they are in superposed position. Forward leader 68 brings the leader sheet connected to the photosensitive and image-receiving elements into position to cause such elements to be superposed upon exiting from the cassette.

The film cassette of the invention is intended to be used in complementary photographic apparatus. Accordingly, it will be apparent to those skilled in the art that such photographic apparatus will include appropriate structure in relation to the detent(s) and shoulder portion(s) of the film cassette such that the photographic apparatus will accept only a photographic film cassette according to the invention which is specifically designed to be used in conjunction with the particular photographic apparatus. The photographic apparatus may be a camera or it may be a camera back which is designed to be fitted to any camera exposure means.

Although the invention has been described with respect to specific preferred embodiments it is not intended to be limited thereto but rather those skilled in the art will recognize that these are illustrative only and that modifications and variations may be made therein which are within the spirit of the invention and the scope of the appended claims.

What is claimed is:

1. A film cassette of the type usable as part of a film pack for housing a plurality of film units of the self-developing type, said cassette comprising
    a housing defining a leading end wall, a pair of sidewalls and a trailing end wall;
    a detent extending outwardly from at least one of said sidewalls; and
    at least one of said sidewalls comprising a shoulder portion located in the vicinity where said sidewall and said trailing end wall come into contact with each other.

2. The film cassette as defined in claim 1 wherein each said sidewall includes a detent extending therefrom and a shoulder portion.

3. The film cassette as defined in claim 1 wherein said shoulder portion of said sidewall forms part of the radius of a circle whose center lies on said sidewall.

4. The film cassette as defined in claim 3 wherein the radius of said shoulder portion of said sidewall is about 0.38 inch.

* * * * *